May 14, 1957 W. G. PFANN 2,792,538

SEMICONDUCTOR TRANSLATING DEVICES WITH EMBEDDED ELECTRODE

Filed Sept. 14, 1950 3 Sheets-Sheet 1

INVENTOR
W. G. PFANN

BY [signature]

ATTORNEY

May 14, 1957 W. G. PFANN 2,792,538

SEMICONDUCTOR TRANSLATING DEVICES WITH EMBEDDED ELECTRODE

Filed Sept. 14, 1950 3 Sheets-Sheet 2

INVENTOR
W. G. PFANN
BY [signature]
ATTORNEY

May 14, 1957 W. G. PFANN 2,792,538

SEMICONDUCTOR TRANSLATING DEVICES WITH EMBEDDED ELECTRODE

Filed Sept. 14, 1950 3 Sheets-Sheet 3

INVENTOR
W. G. PFANN
BY
ATTORNEY

United States Patent Office 2,792,538

Patented May 14, 1957

2,792,538

SEMICONDUCTOR TRANSLATING DEVICES WITH EMBEDDED ELECTRODE

William G. Pfann, Basking Ridge, N. J., assignor to Bell Telephone Laboratories, Incorporated, New York, N. Y., a corporation of New York Application September 14, 1950, Serial No. 184,869

13 Claims. (Cl. 317—235)

This invention relates to semiconductor signal translating devices.

More particularly, this invention pertains to means for and methods of making electrical connection to the semiconductive body or element in rectifiers of the general type disclosed in the application Serial No. 638,351, filed December 29, 1945, of J. H. Scaff and H. C. Theuerer, now Patent 2,602,211, issued July 8, 1952, and in amplifiers of the general type disclosed in the application Serial No. 33,466, filed June 17, 1948, of J. Bardeen and W. H. Brattain, now Patent 2,524,035, granted October 3, 1950.

Devices of the constructions disclosed in the applications above identified comprise a body or wafer of semiconductive material, for example germanium, and one or more point metal contacts bearing against the body or wafer. The metal to semiconductor contact area is small, whereby the power handling capacity of the devices is limited. Also such contacts tend to be mechanically and electrically unstable so that care and relatively complex support or mounting techniques are requisite in the manufacture of the devices. Furthermore, point contacts tend to produce substantial noise components in the signals translated by the devices.

The operating characteristics and performance of devices of the type above mentioned are dependent upon the nature of the semiconductive material immediately adjacent the contacts. Thus, for example, in rectifiers the nature of the barrier or space charge region at the contact-body junction is important in determining the rectification characteristics of the devices. Also, in amplifiers the nature of both the junctions between the emitter and collector connections and the semiconductive body is of import from the standpoint of overall performance of the devices. Point contacts, in general, are not amendable to simple control of the nature of the barrier regions.

One general object of this invention is to improve the structure and the performance characteristics of semiconductor signal translating devices. More specific objects of this invention are to:

Improve the stability of electrical connections to the semiconductive body in translating devices;

Increase the power handling capacity of such devices;

Simplify and facilitate the establishment of electrical connections to the body and thus expedite the manufacture of the devices;

Enable ready control of the nature of the junctions between a semiconductive body and electrical connections thereto;

Attain, in a semiconductor amplifier, a large area collector connection concomitantly with a large collector resistance; and Expedite the fabrication of semiconductor signal translating devices.

In accordance with one broad feature of this invention, one or more of the metallic connections in a semiconductor signal translating device are alloyed with, bonded to or embedded in the semiconductive body. This may be effected in several ways, for example by passing a current through a conductor in contact with or adjacent the semiconductive body to melt a portion of the body and pressing the conductor against this portion, by heating the conductor to a sufficiently high temperature and pressing it into the body, or by casting or molding the semiconductive material about the conductor. The conductor may be of any one of a variety of forms, for example rods, wires or strips of a variety of cross sections or of grid form and may be embedded endwise, edgewise or facewise in the body.

In accordance with another feature of this invention, the bond between the metallic conductor and the semiconductive body is made in such manner that an inversion in conductivity type of the semiconductive material immediately adjacent the conductor obtains whereby a relatively large area PN junction or barrier is formed at the connection. For example, in a specific case wherein a metallic wire is embedded in a body of N conductivity type germanium, the body may be heated by passing an appropriate current through the wire and body to cause conversion of a portion of the body about the wire to P conductivity type germanium. As another specific example, wherein the body is of silicon or germanium of one conductivity type, a conductor of composition including a significant impurity of prescribed character is utilized and, in the fabrication of the connection, at least some of the impurity is diffused into the body thereby to form a sheath or zone of the opposite conductivity type in the body adjacent the conductor. A variety of conductor compositions may be employed thereby, in effect, to tailor any connection to the optimum performance of its particular functions. A number of compositions which may be employed to advantage are disclosed in the application Serial No. 184,870, filed September 14, 1950, of W. G. Pfann. As set forth in detail in that application, such tailoring of connections may be effected through the use of conductors containing a conductivity type determining impurity material, suitable donor materials including phosphorous, arsenic and antimony and suitable acceptor materials including boron, aluminum, gallium, indium, gold and copper. The impurity material may be alloyed with the metal of the conductor or present as a coating thereon. For example, the conductor may be an alloy of gold and a small fraction of one percent of antimony or phosphorous or the conductor may be a wire of gold, aluminum, tungsten or platinum-ruthenium alloy coated by dipping the end of the wire into phosphoric acid or into a powder of red phosphorous or antimony. The conductor may include also both donor and acceptor materials, an illustrative wire being one of an alloy of an inert metal such as platinum, 1.0 percent phosphorous and 0.1 percent aluminum.

The invention and the above noted and other features thereof will be understood more clearly and fully from the following detailed description with reference to the accompanying drawing in which.

Figure 1:
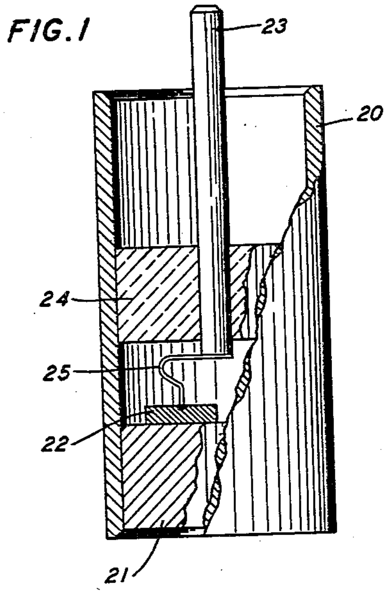
Fig. 1 is an elevational view mainly in section of a semiconductor rectifier illustrative of one embodiment of this invention.

Referring now to the drawing, the rectifier illustrated in Fig. 1 comprises a cylindrical metallic shell 20 having therein, and electrically and mechanically affixed thereto, a metallic block 21 upon which a disc or wafer 22 of semiconductive material is mounted, the disc or wafer 22 being in good electrical contact with the block 21. A rigid metallic terminal 23 is embedded in and extends through an insulating block 24 affixed to the shell 20. The terminal pin 23 carries at its inner end a substantially J-shaped wire spring 25 which is bonded to one face of the semiconductive body.

In an illustrative device, the body or wafer 22 may be of high back voltage N conductivity type germanium prepared, for example, in the manner disclosed in the application Serial No. 638,351, filed December 29, 1945, of J. H. Scaff and H. C. Theuerer, now Patent 2,602,211, issued July 8, 1952; the contact wire spring 25 may be of gold one end of which is spot welded to a nickel terminal pin 23, the wafer 22 may be of the order of .050 inch square and .020 inch thick and the contact wire may be of 2 to 5 mils in diameter.

In the fabrication of the device, the lower face, in Fig. 1, of the disc or wafer 22 is copper plated and tinned and soldered to the block 21. The pin 23, block 24 and wire 25 are assembled as a unit which is positioned with the shell 20 with the free end of the wire spring 25 bearing against the upper surface of the germanium disc or wafer. Then a voltage, for example of 60 cycles is applied between the block 21 and terminal pin 23 from a low resistance source through a resistance, for example of ten ohms, and the voltage is increased from zero gradually whereby the junction between the wire 25 and wafer 22 is heated and the wire begins to fuse to the wafer. When this fusing occurs, the voltage is immediately reduced. Advantageously, the fusing or bonding is carried out in a vacuum of the order of $10^{-2}$ millimeters or less although it can be effected in atmospheres of inert gases or even air.

Also advantageously, before the fusing of the wire to the germanium wafer, the surfaces of these elements are cleaned thoroughly. For example, the surface of the wafer may be polished, as with aluminum oxide on cloth laps, and then etched, for example for about 30 seconds in an etchant composed of 40 cc. water, 10 cc. of 48% hydrofluoric acid and 10 cc. of 30% hydrogen peroxide.

Figure 2:
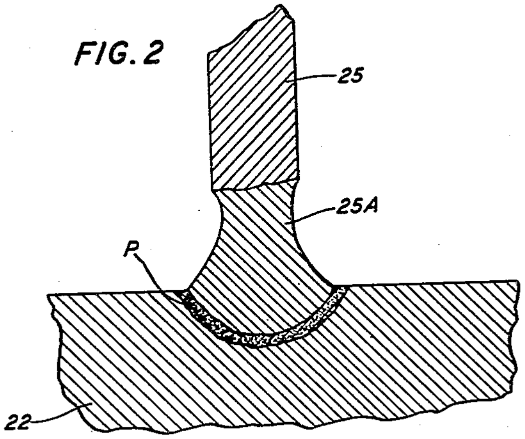
Fig. 2 is a detail view in section and to a greatly enlarged scale illustrating the junction between the semiconductive body and one of the connections thereto.

The physical nature of the bond between the gold wire 25 and the germanium disc or wafer 22 is illustrated in Fig. 2 which is a reproduction of a longitudinal section through a bond. Gold diffuses readily into germanium and alloys with it at a relatively low temperature. Furthermore, gold and germanium form a eutectiferous series of alloys in which the melting point of the eutectic is about 350 degrees C., thus, the bond between the wire 25 and the disc or wafer 22 is formed at a relatively low temperature and this may be effected by passage of moderate currents through the wire and disc in the fusing operation. As illustrated in Fig. 2, there is formed between the disc and wire a eutectic section 25A.

The bond between the wire 25 and the disc or wafer 22 is mechanically very strong. Further, the joint between the wire and disc is of relatively large area, being as illustrated in Fig. 2, of somewhat greater area than the wire. The wire 25 may be of flexible material whereby stresses in the bond as result of wire flexure are minimized. Also diffusion of the gold into the germanium effects an inversion in the conductivity type of the wafer 22 immediately adjacent the junction whereby a PN barrier region is produced. This region is found in the germanium just outside the eutectic section 25A and is indicated at P in Fig. 2.

Figure 3:
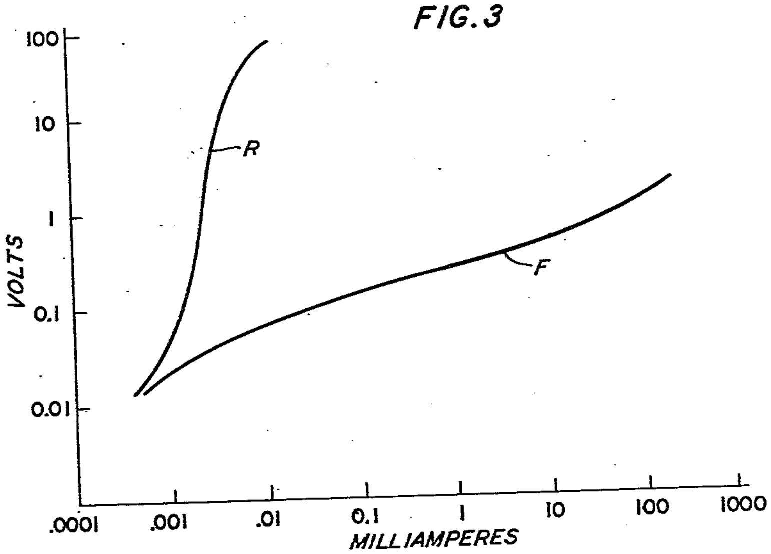
Fig. 3 is a graph depicting typical operating characteristics of a device of the construction illustrated in Fig. 1.

Typical operating characteristics for rectifiers of the construction above described are illustrated in Fig. 3 wherein the curve R portrays the reverse current voltage characteristic and the curve F depicts the forward current voltage characteristic.

Particularly to be noted from Fig. 3 are the high values of the forward current, for example, 55 milliamperes at one volt, the low value of reverse current, for example 0.002 milliampere at one volt and 0.007 milliampere at 50 volts, and the peak reverse voltages, specifically of the order of 100 volts. As compared with the presently well known tungsten point contact germanium disc rectifier units, devices constructed in accordance with this invention and having the characteristics portrayed in Fig. 3 exhibit a forward current greater by a factor of about 3, a 50 volt reverse current lower by a factor of about 10 and a comparable peak reverse voltage.

Although in the specific device described hereinabove a gold contact wire bonded to a germanium body was utilized it will be understood that other semiconductive materials, for example silicon, and other contact materials may be utilized. In general, the contact wire material utilized should be of the class or contain a material which will diffuse into the semiconductive body and effect an inversion in conductivity type of a region immediately adjacent the joint between the wire and body. A number of typical wire compositions which may be utilized to advantage are disclosed in the application of W. G. Pfann hereinabove identified.

Also, although the invention has been described thus far with particular reference to semiconductive bodies of N conductivity type, it will be understood, of course, that the invention may be utilized also in the fabrication of semiconductor translating devices including P conductivity type bodies. Suitable contact wire materials for use in the fabrication of bonded connections to P type semiconductive bodies also are disclosed in the application of W. G. Pfann identified hereinabove.

The electrical characteristics of the contact to body junction are dependent somewhat upon the impurity content of the germanium. Specifically, it may be noted that the specific characteristics portrayed in Fig. 3 are for devices wherein the germanium disc was obtained from the bottom portion of an ingot prepared in the manner described in the application of J. H. Scaff and H. C. Theuerer referred to hereinabove. For example, it has been found that in general as the antimony content of the ingot is increased, for rectifiers of the construction shown in Fig. 1 and heretofore described, the forward current at low voltages increases and the reverse current also increases. Also, in general, the peak back voltage decreases as the impurity content of the germanium material increases.

Figure 4:
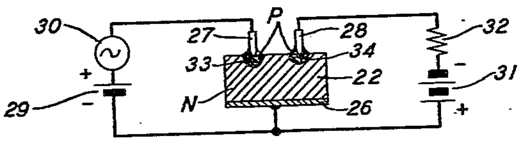
Fig. 4 is in part a sectional view and in part a circuit diagram illustrating a semiconductor amplifier constructed in accordance with this invention.

The amplifier illustrated in Fig. 4 is of the general configuration described in detail in the application of Bardeen and Brattain referred to hereinabove. It comprises the semiconductive body 22 having a substantially ohmic base connection 26 to one of the major faces thereof and emitter and collector connections 27 and 28, respectively to the opposite face thereof. The emitter 27 is biased in the forward direction as by a source 29 and input signals from a source 30 are impressed between the emitter and base connections. The collector 28 is biased in the reverse direction as by a source 31 in series with a load indicated generally by the resistor 32.

The emitter and collector 27 and 28 may be wires each embedded in the semiconductive body 22. The embedding may be effected by passing current through either wire and the body sufficient to fuse a portion of the body adjacent the wire, or portions of both wire and body, and the pressing the wire into or against the body, by heating the wire independently and pressing it into the semiconductive body or by drawing an arc between the wire and the body and then fusing the two together.

Each of the emitter and collector connections may be tailored to the optimum performance of its prescribed function. Specifically, a desideratum for the emitter connection is that it be efficacious for the injection into the semiconductive body of charge carriers of the sign opposite that of those normally in excess in the semiconductive body. Desiderata for the collector connection 28 are that it provide a high impedance and a high current multiplication factor. The tailoring may be effected in one way by utilization of appropriate collector and emitter materials in the manner disclosed in the application of W. G. Pfann heretofore identified. For example, it has been found that a pure gold connection provides an efficient emitter of holes into N type germanium. It has been found also, for example, that a collector connection of gold having a small proportion or trace of a donor material therein provides a particularly advantageous collector connection to N type germanium. In specific cases wherein the body 22 is of N conductivity type germanium, a collector wire 28 composed of an alloy of gold containing between 0.0001 to 1.0 percent antimony is satisfactory.

The tailoring of the emitter and collector connections may be effected also, or enhanced by, a heat treatment of the wire to semiconductive body junction. Specifically, a zone or region 33 or 34 of P conductivity type material may be produced about the emitter and collector 27 and 28, respectively, by passing a current through the wire and body 22. Details of such thermal conversion of germanium material from one conductivity type to the other are set forth in the application of J. H. Scaff and H. C. Theuerer identified hereinabove. Such conversion is effected most advantageously in the manner noted for wire materials which do not form alloys with germanium having melting points below the minimum N to P conversion temperature.

It will be understood, of course, that materials other than gold and alloys other than gold may be utilized for the emitter and collector connections respectively. Also it will be understood that the semiconductive body may be of silicon and the emitter and collector connections tailored to the optimum performance of their functions by the inclusion of appropriate impurities in the emitter and collector connections. Also, it is evident that although the invention has been described thus far with particular reference to semiconductive bodies of N conductivity type it may be used in the fabrication of devices utilizing P conductivity type material.

Figure 5:
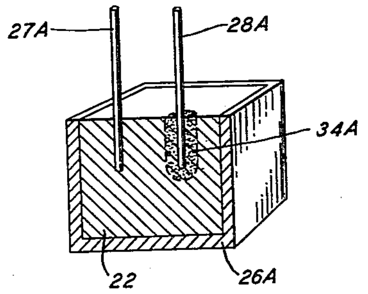
Figs. 5 and 6 are perspective views in section of semiconductor amplifiers illustrative of this invention wherein two or more of the connections are embedded in the semiconductive body.

Another construction suitable for amplifiers and characterized by relatively large areas for the emitter and collector connections is illustrated in Fig. 5. In the device illustrated in this figure, the semiconductive body 22 is cast within a shell or housing 26A and about two wires, 27A and 28A, constituting the emitter and collector connections. The shell 26A may be utilized as the base connection. Advantageously, the wires constituting the emitter and collector connections are of a material the coefficient of expansion of which is substantially the same as that for germanium. Iron nickel alloys in the region of 40 percent nickel, platinum and tantalum are illustrative materials the thermo-expansivity of which is similar to that for germanium. Also, in devices of the construction illustrated in Fig. 5, the emitter or collector connection, or both, may be of materials having an appropriate impurity therein for the purpose of tailoring the connection. Further, as was described hereinabove with reference to the device of Fig. 4, one or both of the emitter and collector connections may be subjected to a heat treatment thereby to form a zone of conductivity type opposite that of the major part of the body 22 about the connection. One such zone 34A about the collector connection 28A is illustrated in Fig. 5.

Figure 6:
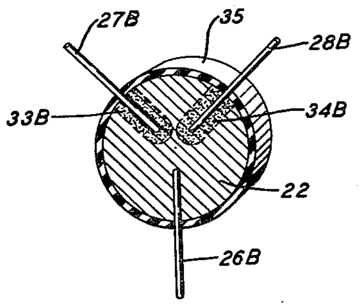

The device illustrated in Fig. 6 comprises a disc or sphere of semiconductive material 22 cast about three wires 26B, 27B and 28B constituting the base, emitter and collector connections respectively. The wire 26B may be advantageously of a high melting point metal, for example tungsten, platinum or tantalum. The emitter and collector wires 27B and 28B respectively, may be of the metals or alloys heretofore mentioned in the description of the embodiments of the Figs. 1, 4 and 5.

Advantageously, in the device of Fig. 6 the semiconductive body 22 has applied thereto a protective coating 35, for example of a plastic. Zones 33B and 34B of conductivity type opposite that of the major portion of the body 22 may be formed about the emitter and collector wires in the manners described heretofore.

Figure 7:
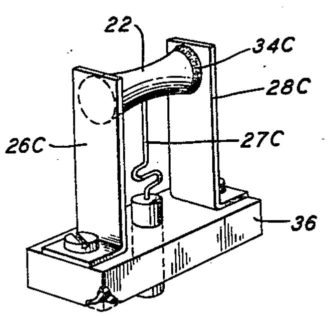
Fig. 7 is a perspective view of another amplifier constructed in accordance with this invention wherein the semiconductive body is bonded to two metallic strips which constitute connections thereto.

In the embodiment of this invention illustrated in Fig. 7, the semiconductive body 22 is melted between and bonded to two metallic strips affixed to an insulating base 36. One of the strips 26C serves as the base connection and the other strip 28C may be utilized as either the emitter or collector conection. A third connection 27C which may be either a point contact or embedded in or bonded to the body 22, serves as the collector or emitter connection.

Figure 8:
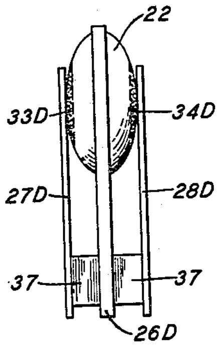
Figs. 8 and 9 are elevational views, orthogonally related, of another amplifier constructed in accordance with this invention wherein the semiconductive body is bonded to the base, emitter and collector connections.
Figure 9:
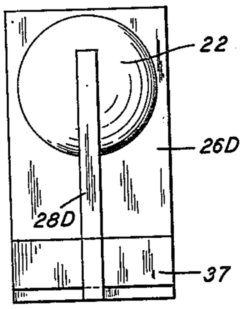

In the device illustrated in Figs. 8 and 9, the semiconductive body 22 is melted upon and fused to a strip 26D having an aperture therein into which the body fits. The strip 26D constitutes the base connection and is affixed in pileup relation with insulating spacers 37 and metallic strips 27D and 28D. The latter two strips, which serve as emitter and collector respectively, are bonded to the semiconductive body 22.

Figure 10:
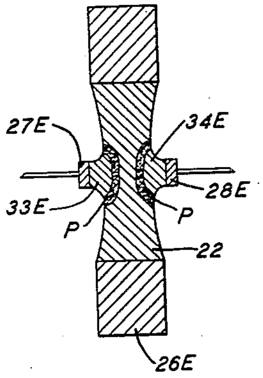
Fig. 10 is a sectional view of still another amplifier wherein the emitter and collector connections are bonded to opposite faces of a wafer of the semiconductive material.

The invention may be utilized also in the fabrication of amplifiers of the general type disclosed in the application Serial No. 45,023, filed August 19, 1948, of W. E. Kock and R. L. Wallace, now Patent 2,560,579, issued July 17, 1951. One typical structure for this is illustrated in Fig. 10. The semiconductive body in the form of a disc is mounted in an annular base connection and support 26E and the emitter and collector connections 27E and 28E respectively, may be in the form of discs bonded to the body 22 in one of the manners described hereinabove.

Figure 11:
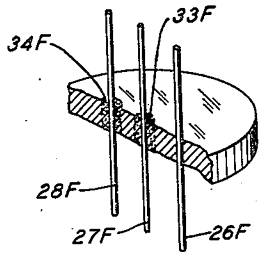
Fig. 11 is a perspective view partly in section of a body and electrode unit suitable for use in amplifiers wherein the conductors extend through the body and are embedded therein.

In the construction illustrated in Fig. 11, the emitter, collector and base connections 27F, 28F and 26F respectively, are constructed by wires passing through a disc of wafer 22 of the semiconductive material. A particular feature of this construction is that it facilitates the formation of zones such as 33F and 34F about the emitter and collector respectively, by thermal conversion of the conductivity type of regions in the semiconductivity material. This conversion is effected by passing a current through the wire about which the formation of such a zone is desired.

Figure 12:
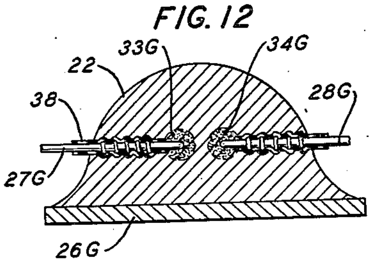
Fig. 12 is an elevational view in section of still another illustrative embodiment of this invention wherein the emitter and collector connections are embedded in the semiconductive body and internal portions of the body are of conductivity type opposite the remainder thereof.

In the embodiment of the invention illustrated in Fig. 12, the semiconductive body 22 is melted upon a plate 26G, which may serve as the base electrode, and about a pair of wires 27G and 28G, each having an insulating coating 38 upon a major portion thereof. The wires 27G and 28G may be utilized as the emitter and collector respectively, having zones 33G and 34G about the inner ends thereof, the zones being of conductivity type opposite that of the body 22 and formed in the manners described heretofore. Advantageously, the surface of the insulating sleeves 38, which may be, for example, a heavy oxide coating on the wires, are roughened or corrugated as indicated in Fig. 12 to strengthen the joint between the wires and the semiconductor.

Figure 13A:
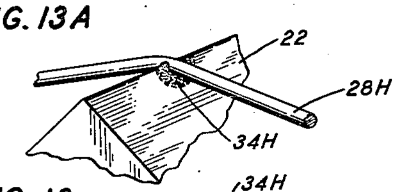
Fig. 13A is a fragmentary enlarged view of a portion of the device shown in Fig. 13.

The emitter and collector connections may be embedded sidewise as well as endwise in the semiconductive body. For example, in the device illustrated in Figs. 13 and 13A the emitter and collector wires 27H and 28H respectively, are heated and pressed sidewise into the apex of a wedge-shaped body 22 of semiconductive material mounted upon a base electrode 26H.

Figure 14:
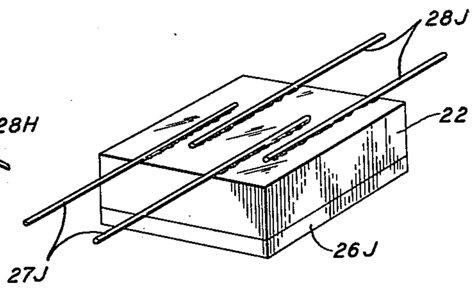
Fig. 14 is a perspective view of a translating device including a plurality of wire electrodes embedded facewise in the semiconductive body.
Figure 15:
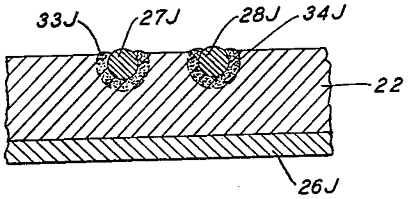
Fig. 15 is a sectional view of a portion of the device illustrated in Fig. 14, and to an enlarged scale, showing the nature of the joint between the wires and the semiconductive body.

In another such construction, illustrated in Figs. 14 and 15, several collectors and emitters 28J and 27J respectively, are embedded edgewise in the semiconductive body 22 mounted upon the base electrode 26J.

Figure 13:
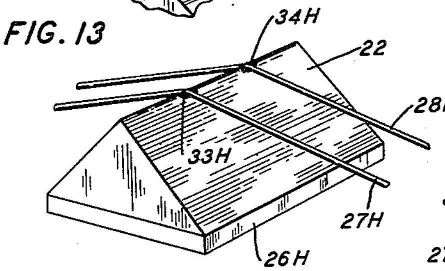
Fig. 13 is a perspective view of a translating device wherein two of the connections to the semiconductive body are embedded edgewise or facewise therein.

In the constructions illustrated in Figs. 13 to 15, it will be understood that regions of the semiconductive body may be heated to enable insertion of the wires thereinto by passing a current through the wires and body or through the wires themselves in the embodiment illustrated in Fig. 13. Zones 33 and 34 of conductivity type opposite that of the remaining portion of the body may be formed at the junctions of the wires and the semiconductive body in the manners described heretofore.

Figure 16:
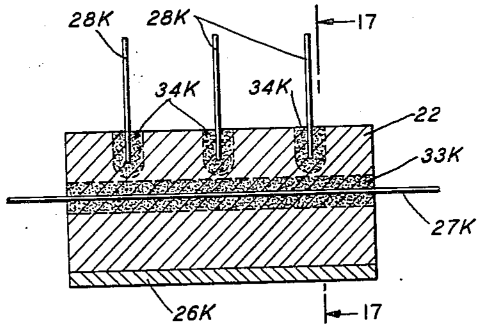
Fig. 16 is an elevational view in section of another device illustrative of this invention.
Figure 17:
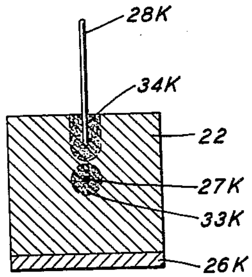
Fig. 17 is a sectional view taken along plane 17—17 of Fig. 16.

Still another construction embodying features of this invention is illustrated in Figs. 16 and 17. It comprises a wire 27K embedded and extending through the semiconductive body 22 mounted on the base 26K and three wires 28K embedded in the body 22 and extending into proximity to the wire 27K. The wire 27K may be utilized as the emitter and the wires 28K as collector or conversely. The several wires 28K may be of the same or different compositions, each being tailored to the optimum performance of its prescribed functions. Zones 33K and 34K of conductivity type opposite that of the remainder of the body may be provided about the several wires in ways which will be apparent from the preceding description herein.

Although several specific embodiments of this invention have been shown and described, it will be understood that they are but illustrative and that various modifications may be made therein without departing from the scope and spirit of this invention.

What is claimed is:

1. A signal translating device comprising a body of semiconductive material, a wire connector embedded sidewise in said body and a bond between said body and said connector consisting of an alloy of said semiconductive material and the material of the connector.

2. A signal translating device comprising a body of germanium, and an electrical connector of gold containing a donor impurity embedded in said body.

3. A signal translating device comprising a body of semiconductive material, wire emitter and collector connections embedded sidewise in said body, and a base connection to said body.

4. A signal translating device comprising a body of semiconductive material, a base connection to said body, and wire emitter and collector connectors embedded in said body and extending through said body.

5. A signal translating device in accordance with claim 4 wherein the portion of said body immediately adjacent one of said connectors is of conductivity type opposite that of the bulk of said body.

6. A signal translating device comprising a body of semiconductive material having an edge portion, and a wire connector to said body embedded sidewise in said edge portion.

7. A translating device comprising a body of semiconductive material, an electrical connector to said body, the area of said connector adjacent said body and conforming to the surface thereof being substantially greater than the contact area of a pointed whisker contact, said connector comprising a major metallic ingredient and a small quantity of a conductivity-type determining impurity selected from the group consisting of acceptors and donors, and a bond between said body and said connector consisting of an alloy of the materials of said connector and of said body, the area of engagement between said bond and said body being substantially greater than said conforming area of said connector adjacent thereto.

8. A translating device comprising a body of semiconductive material, a first metallic member, the area of said first member adjacent said body and conforming to the surface thereof being substantially greater than the contact area of a pointed whisker contact, an alloyed connection between said first member and one major surface of said body having an area of engagement with said body which is greater than said conforming area of said first member adjacent thereto, a second metallic member, the area of said second member adjacent said body and conforming to the surface thereof being substantially greater than the contact area of a pointed whisker contact, an alloyed connection between said second member and the other major surface of said body having an area of engagement with said body which is greater than said conforming area of said second member adjacent thereto and having at least a portion of its area overlap a portion of the projection of the alloyed connection of said first member through the thickness of said body, regions of semiconductive material in said body contiguous with each of said alloyed connections of a conductivity type opposite that of the adjacent portions of said body and a base connection to said body.

9. A translating device as defined in claim 8 wherein said alloyed connections of said first and second members are coaxially aligned.

10. A translating device as defined in claim 8 wherein said base connection extends around the periphery of at least one of said alloyed connections.

11. A translating device as defined in claim 8 wherein said base connection is annular.

12. A translating device in accordance with claim 7 in which said semiconductive material is one of the group consisting of germanium and silicon.

13. A translating device in accordance with claim 7 in which said electrical connector is one selected from the group consisting of gold, aluminum, tungsten, and platinum-ruthenium alloy.

References Cited in the file of this patent

UNITED STATES PATENTS

| | | |
|---|---|---|
| 2,486,776 | Barney | Nov. 1, 1949 |
| 2,524,035 | Bardeen et al. | Oct. 3, 1950 |
| 2,537,255 | Brattain | Jan. 9, 1951 |

(Other references on following page)

UNITED STATES PATENTS

| | | |
|---|---|---|
| 2,563,503 | Wallace | Aug. 7, 1951 |
| 2,606,960 | Little | Aug. 12, 1951 |
| 2,623,102 | Shockley | Dec. 23, 1952 |
| 2,629,672 | Sparks | Feb. 24, 1953 |
| 2,646,536 | Benzer et al. | July 21, 1953 |
| 2,666,814 | Shockley | Jan. 19, 1954 |
| 2,701,326 | Pfann et al. | Feb. 1, 1955 |
| 2,704,818 | North | Mar. 22, 1955 |

FOREIGN PATENTS

| | | |
|---|---|---|
| 518,421 | Germany | Oct. 3, 1931 |

OTHER REFERENCES

North: J. Applied Physics, vol. 17, November 1946, pp. 912–915.